United States Patent
Konishi et al.

(10) Patent No.: US 11,169,301 B2
(45) Date of Patent: Nov. 9, 2021

(54) DETERMINATION DEVICE, MULTIPLE OPTICAL-AXIS PHOTOELECTRIC SENSOR, DETERMINATION DEVICE CONTROL METHOD, INFORMATION PROCESSING PROGRAM, AND RECORDING MEDIUM

(71) Applicant: OMRON Corporation, Kyoto (JP)

(72) Inventors: Yasuchika Konishi, Kusatsu (JP); Keisaku Kikuchi, Kusatsu (JP); Minoru Hashimoto, Ritto (JP)

(73) Assignee: OMRON OORPORATION, Kyoto (JP)

( * ) Notice: Subject to any disclaimer, the term of this patent is extended or adjusted under 35 U.S.C. 154(b) by 122 days.

(21) Appl. No.: 16/642,046

(22) PCT Filed: Jan. 23, 2019

(86) PCT No.: PCT/JP2019/002049
§ 371 (c)(1),
(2) Date: Feb. 26, 2020

(87) PCT Pub. No.: WO2019/176305
PCT Pub. Date: Sep. 19, 2019

(65) Prior Publication Data
US 2021/0080612 A1 Mar. 18, 2021

(30) Foreign Application Priority Data
Mar. 13, 2018 (JP) .............................. JP2018-045657

(51) Int. Cl.
*G01V 8/20* (2006.01)
*G01B 11/27* (2006.01)
*G08B 13/183* (2006.01)

(52) U.S. Cl.
CPC ................ *G01V 8/20* (2013.01); *G01B 11/27* (2013.01); *G08B 13/183* (2013.01)

(58) Field of Classification Search
None
See application file for complete search history.

(56) References Cited

U.S. PATENT DOCUMENTS

| | | | |
|---|---|---|---|
| 2006/0071154 A1 | 4/2006 | Osako et al. | |
| 2007/0125938 A1 | 6/2007 | Kikuchi et al. | |

FOREIGN PATENT DOCUMENTS

| | | |
|---|---|---|
| JP | 2002-204151 A | 7/2002 |
| JP | 2005-114551 A | 4/2005 |
| JP | 2007-150986 A | 6/2007 |
| JP | 2009-124666 A | 6/2009 |
| JP | 2009-207190 A | 9/2009 |
| JP | 2013-223237 A | 10/2013 |

OTHER PUBLICATIONS

An English translation of the International Search Report("ISR") of PCT/JP2019/002049 dated Apr. 16, 2019.
The Written Opinion ("WO") of PCT/JP2019/002049 dated Apr. 16, 2019.

*Primary Examiner* — Thomas S McCormack
(74) *Attorney, Agent, or Firm* — Metrolex IP Law Group, PLLC

(57) ABSTRACT

An aspect of the present invention allows for determining a cause of abnormality in output of a light-receiving element among light-receiving elements in a multiple optical-axis photoelectric sensor. A multiple optical-axis photoelectric sensor (1) determines that electrical noise occurs, in a case where abnormality in output occurs in both of adjacent light-receivable periods (Ts) in one light-receiving cycle (Tc).

8 Claims, 7 Drawing Sheets

DETERMINATION DEVICE, MULTIPLE OPTICAL-AXIS PHOTOELECTRIC SENSOR, DETERMINATION DEVICE CONTROL METHOD, INFORMATION PROCESSING PROGRAM, AND RECORDING MEDIUM

TECHNICAL FIELD

The present invention relates to, for example, a determining device configured to determine a cause of abnormality in output of a light-receiving element in a multiple optical-axis photoelectric sensor.

BACKGROUND ART

Conventionally, an attempt to grasp in detail a state of reception of disturbance light has been made for a multiple optical-axis photoelectric sensor, which includes a plurality of light-emitting elements and a plurality of light-receiving elements corresponding to the plurality of light-emitting elements. For example, Patent Literature 1 below discloses a multiple optical-axis photoelectric sensor which generates information indicating a state of reception of disturbance light in each of light-receiving elements, on the basis of a signal from each of the light-receiving elements under a condition in which no light is emitted from a plurality of light-emitting elements.

CITATION LIST

Patent Literature

[Patent Literature 1]
Japanese Patent Application Publication Tokukai No. 2007-150986 (Publication date: Jun. 14, 2007)

SUMMARY OF INVENTION

Technical Problem

However, conventional techniques as described above have a problem in that in a case where abnormality in output of a light-receiving element occurred in the multiple optical-axis photoelectric sensor, a cause of that abnormality in output cannot be determined. For example, according to the conventional techniques, it is not possible to determine whether abnormality in output of a light-receiving element in a multiple optical-axis photoelectric sensor is caused by electrical noise (disturbance voltage) or disturbance light.

An object of an aspect of the present invention is to provide a determining device capable of determining a cause of abnormality in output of a light-receiving element in a multiple optical-axis photoelectric sensor.

Solution to Problem

In order to solve the above problem, a determining device in accordance with an aspect of the present invention is configured to be a determining device configured to determine a cause of abnormality in output of a light-receiving element among light-receiving elements in a multiple optical-axis photoelectric sensor, the determining device including: a first determining section configured to determine whether or not abnormality in output occurred, with regard to each of respective light-receivable periods of the light-receiving elements, the light-receivable periods being arranged in one cycle so as not to overlap with each other; and a second determining section configured to (1) determine that electrical noise occurred, in a case where, with regard to each of adjacent light-receivable periods among the light-receivable periods in the one cycle, the first determining section has determined that the abnormality in output occurred, or (2) determine that disturbance light noise occurred, in a case where, with regard to one light-receivable period or two or more non-adjacent light-receivable periods among the light-receivable periods in the one cycle, the first determining section has determined that the abnormality in output occurred.

In order to solve the above problem, a control method in accordance with an aspect of the present invention is configured to be a method of controlling a determining device configured to determine a cause of abnormality in output of a light-receiving element among light-receiving elements in a multiple optical-axis photoelectric sensor, the method including the steps of: A) determining whether or not abnormality in output occurred, with regard to each of respective light-receivable periods of the light-receiving elements, the light-receivable periods being arranged in one cycle so as not to overlap with each other; and B) (1) determining that electrical noise occurred, in a case where, with regard to each of adjacent light-receivable periods among the light-receivable periods in the one cycle, it is determined in the step A) that the abnormality in output occurred, or (2) determining that disturbance light noise occurred, in a case where, with regard to one light-receivable period or two or more non-adjacent light-receivable periods among the light-receivable periods in the one cycle, it is determined in the step A) that the abnormality in output occurred.

Advantageous Effects of Invention

An aspect of the present invention advantageously makes it possible to determine a cause of abnormality in output of a light-receiving element in a multiple optical-axis photoelectric sensor.

DESCRIPTION OF EMBODIMENTS

Embodiment 1

The following will discuss an embodiment in accordance with an aspect of the present invention (hereinafter, also referred to as "the present embodiment"), with reference to FIGS. 1 to 7. Note that identical or corresponding parts in drawings are given identical reference signs, and explanations thereof will be not repeated. For easy understanding of a multiple optical-axis photoelectric sensor 1 in accordance with an aspect of the present invention, first, the following will discuss an overview of the multiple optical-axis photoelectric sensor 1, with reference to FIG. 2. Note that the following will discuss an example in which a light receiver 10 of a multiple optical-axis photoelectric sensor 1 carries out a cause determining process for determining a cause of abnormality in output of a light-receiving element(s) 11 of the multiple optical-axis photoelectric sensor 1. In other words, the following will discuss an embodiment which realizes, by the light receiver 10, a determining device for determining a cause of abnormality in output of the light-receiving element(s) 11.

§ 1. Application Example

Figure 2:
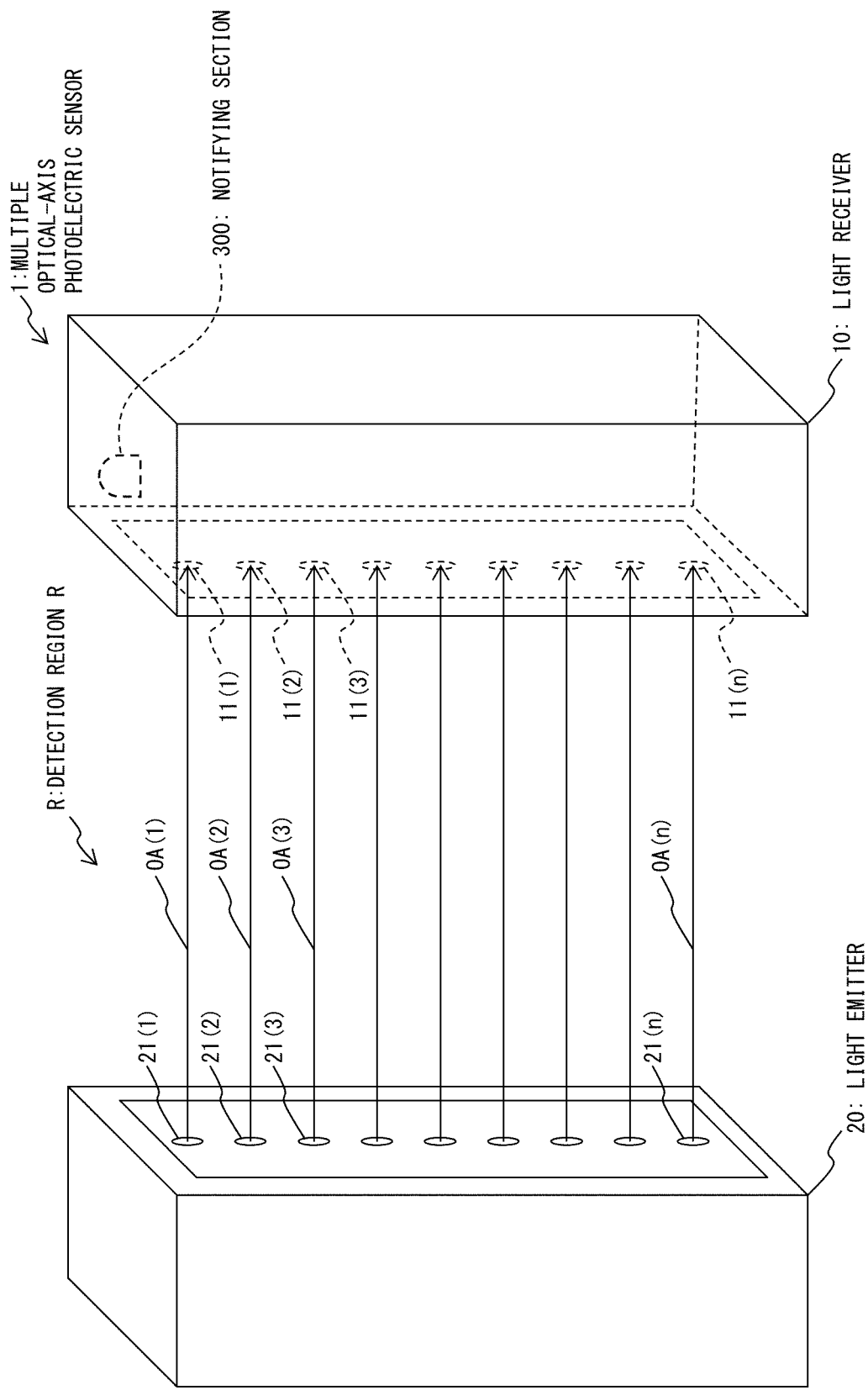
FIG. 2 is a perspective view illustrating an example of appearance of the multiple optical-axis photoelectric sensor including the light receiver illustrated in FIG. 1.

FIG. 2 is a perspective view illustrating an example of appearance of the multiple optical-axis photoelectric sensor 1. As in the example illustrated in FIG. 2, the multiple optical-axis photoelectric sensor 1 includes a light emitter 20 and a light receiver 10, which are provided so as to face each other via a predetermined detection region R. As in the example illustrated in FIG. 2, a plurality of optical axes OA are set between the light emitter 20 and the light receiver 10. The multiple optical-axis photoelectric sensor 1 detects an object, which intrudes in the detection region R, on the basis of input of light along these optical axes OA and an interrupted state of the light.

In the case of a conventional multiple optical-axis photoelectric sensor, on detecting an inconvenience (noise entry, trouble, or the like) which had occurred in that conventional multiple optical-axis photoelectric sensor, the conventional multiple optical-axis photoelectric sensor simply turned off output. Further, the conventional optical-axis photoelectric sensor notified a user of only the occurrence of the inconvenience without a reason for the inconvenience by, for example, causing a light emission diode (LED) to blink. Accordingly, the conventional multiple optical-axis photoelectric sensor did not allow the user to know the reason why the output of the conventional multiple optical-axis photoelectric sensor was kept OFF. On this account, the user could not determine, for example, if the user could power up the multiple optical-axis photoelectric sensor again or if replacement of the multiple optical-axis photoelectric sensor itself would be necessary. Therefore, once the output was turned OFF, the conventional multiple optical-axis photoelectric sensor required time for maintenance.

In light of the above, the multiple optical-axis photoelectric sensor 1 carries out a cause determining process for diagnosing (i.e., determining) a cause of an inconvenience which occurred in the multiple optical-axis photoelectric sensor 1, and then notifies a user of a result of carrying out the cause determining process. More specifically, the multiple optical-axis photoelectric sensor 1 first determines "whether or not abnormality in output occurred in a light-receiving element 11 (i.e., whether an output of the light-receiving element 11 in an abnormality detection period Td exceeded a predetermined value (described later))". In a case where it is determined that "abnormality in output occurred in the light-receiving element 11", the multiple optical-axis photoelectric sensor 1 further determines a cause of the abnormality in output and notifies a user of a result of the cause thus determined. In particular, the multiple optical-axis photoelectric sensor 1 determines "whether the cause of the abnormality in output of the light-receiving element 11 is electrical noise (disturbance voltage) or disturbance light", and notifies a user of the cause.

In a case where the abnormality in output of the light-receiving element 11 occurs, the multiple optical-axis photoelectric sensor 1 determines "whether a cause of abnormality in output is electrical noise or disturbance light", on the basis of the number of consecutive outputs (e.g., analog outputs) which are outputted from light-receiving elements 11, respectively, and exceed a predetermined value in one cycle. For example, the multiple optical-axis photoelectric sensor 1 monitors an analog output prior to receiving emitted light (i.e., input of a light signal) in a light-receivable period Ts (light signal reception time). At this time, when a signal level exceeds the predetermined value (ON threshold value), the multiple optical-axis photoelectric sensor 1 determines that abnormality in output occurred (i.e., there is a possibility that disturbance light or electrical noise is occurring). Further, in a case where consecutive analog outputs of a plurality of optical axes exceed the predetermined value, the multiple optical-axis photoelectric sensor 1 determines that "the cause of the abnormality in output is electrical noise superimposed on the analog outputs". Then, the multiple optical-axis photoelectric sensor 1 leaves a log inside, and notifies a user of the cause, as maintenance information. On the other hand, in a case where no consecutive analog outputs of a plurality of optical axes exceed the predetermined value, the multiple optical-axis photoelectric sensor 1 determines that "the cause of the abnormality in output is disturbance light noise", and notifies a user of the occurrence of disturbance light.

In a case where the multiple optical-axis photoelectric sensor 1 determines that "the cause of the abnormality in output of the light-receiving element 11 is electrical noise", the multiple optical-axis photoelectric sensor 1 causes a notifying section 300 (indicator light) to light up without blinking. On the other hand, in a case where the multiple optical-axis photoelectric sensor 1 determines that "the cause of the abnormality in output of the light-receiving element 11 is disturbance light", the multiple optical-axis photoelectric sensor 1 causes the notifying section 300 to blink.

Therefore, the user can know "whether the cause of the abnormality in output of the light-receiving element 11 is electrical noise (disturbance voltage) or disturbance light", and can shorten a time necessary for removing the inconvenience which occurred in the multiple optical-axis photoelectric sensor 1, and also can shorten a time for maintenance.

The multiple optical-axis photoelectric sensor 1 determines "whether the cause of the abnormality in output of the light-receiving element 11 is electrical noise or disturbance light", and causes the notifying section 300 (indicator light) to indicate the cause of the abnormality in output. In this case, for example, the multiple optical-axis photoelectric sensor 1 changes a way of indication depending on whether the cause is electrical noise or disturbance light. Accordingly, the multiple optical-axis photoelectric sensor 1 can visualize the cause of the abnormality in output of the light-receiving element 11, that is, "whether the cause of the abnormality in output is electrical noise or disturbance light".

The multiple optical-axis photoelectric sensor 1 leaves a log of an abnormal output at the time when abnormality in output occurred, and causes an external display device (e.g., a monitor device) to display the log. Further, the multiple optical-axis photoelectric sensor 1 analyzes the log which has been left, and causes the external display device to display a proposal for improvement based on a result of analyzing the log. For example, in a case where the multiple optical-axis photoelectric sensor 1 determines that the cause of the abnormality in output is disturbance light, the multiple optical-axis photoelectric sensor 1 causes an external display device (e.g., a monitor device) to display a proposal for improving resistance to disturbance light. On the other hand, in a case where the multiple optical-axis photoelectric sensor 1 determines that the cause of the abnormality in output is electrical noise, the multiple optical-axis photoelectric sensor 1 uses a software filter to remove the electrical noise which caused the abnormality in output.

§ 2. Configuration Example (Overview of Appearance and the Like)

As in the example illustrated in FIG. 2, in the multiple optical-axis photoelectric sensor 1, the light emitter 20 includes a plurality of light-emitting elements 21 which are provided so as to align in a line, while the light receiver 10 includes a plurality of light-receiving elements 11 which are provided so as to align in a line. In the multiple optical-axis photoelectric sensor 1, the light emitter 20 and the light receiver 10 are arranged such that each of the plurality of light-emitting elements 21 and a corresponding one of the plurality of light-receiving elements 11 face each other in a one-to-one relation so as to make a pair.

In other words, the multiple optical-axis photoelectric sensor 1 includes n light-emitting elements 21 and n light-receiving element 11, where "n" is "an integer of not less than 2". The light-emitting elements 21(1), 21(2), 21(3), . . . , 21(n) of the light emitter 20 correspond to the light-receiving elements 11(1), 11(2), 11(3), . . . , 11(n) of the light receiver 10, respectively. Then, the light emitter 20 and the light receiver 10 are arranged such that "the light-emitting elements 21(1) through 21(n)" and "the light-receiving elements 11(1) through 11(n)" face each other or are opposed to each other, respectively. Note that in the following description, "n" is "an integer of not less than 2", and "m" is "an integer of not less than 1" which meets "n≥m+1".

An optical axis OA(1) is formed between the light-emitting element 21(1) and the light-receiving element 11(1), an optical axis OA(2) is formed between the light-emitting element 21(2) and the light-receiving element 11(2), and an optical axis OA(3) is formed between the light-emitting element 21(3) and the light-receiving element 11(3). Similarly, an optical axis OA(n) is formed between the light-emitting element 21(n) and the light-receiving element 11(n), Note that in the following description, in a case where each of the light-emitting elements 21 needs to be distinguished from the other light-emitting elements 21, an index such as "(1)", "(2)", "(3)", . . . , or "(n)" is appended for distinction with respect to the reference sign. For example, the light-emitting elements 21 are distinguished from one another by expressions such as the "light-emitting element 21(1)", the "light-emitting element 21(2)", "the light-emitting element 21(3)", . . . , or the "light-emitting element 21(n)". In a case where there is no need to distinguish each of the light-emitting elements 21 from the other light-emitting elements 21, the expression "light-emitting element(s) 21" is simply used. Similarly, in a case where each of the light-receiving elements 11 needs to be distinguished from the other light-receiving elements 11, an index such as "(1)", "(2)", "(3)", . . . , or "(n)", is appended for distinction with respect to the reference sign. In a case where there is no need to distinguish each of the light-receiving elements 11 from the other light-receiving elements 11, the expression "light-receiving element(s) 11" is simply used. Further, similarly, in a case where each of the optical axes OA needs to be distinguished from the other the optical axes OA, an index such as "(1)", "(2)", "(3)", . . . , or "(n)" is appended for distinction with respect to the reference sign. In a case where there is no need to distinguish each of the optical axes OA from the other optical axes OA, the expression "optical axis (axes) OA" is simply used.

(Overview of Light Emitting and Receiving Processes)

Figure 3:
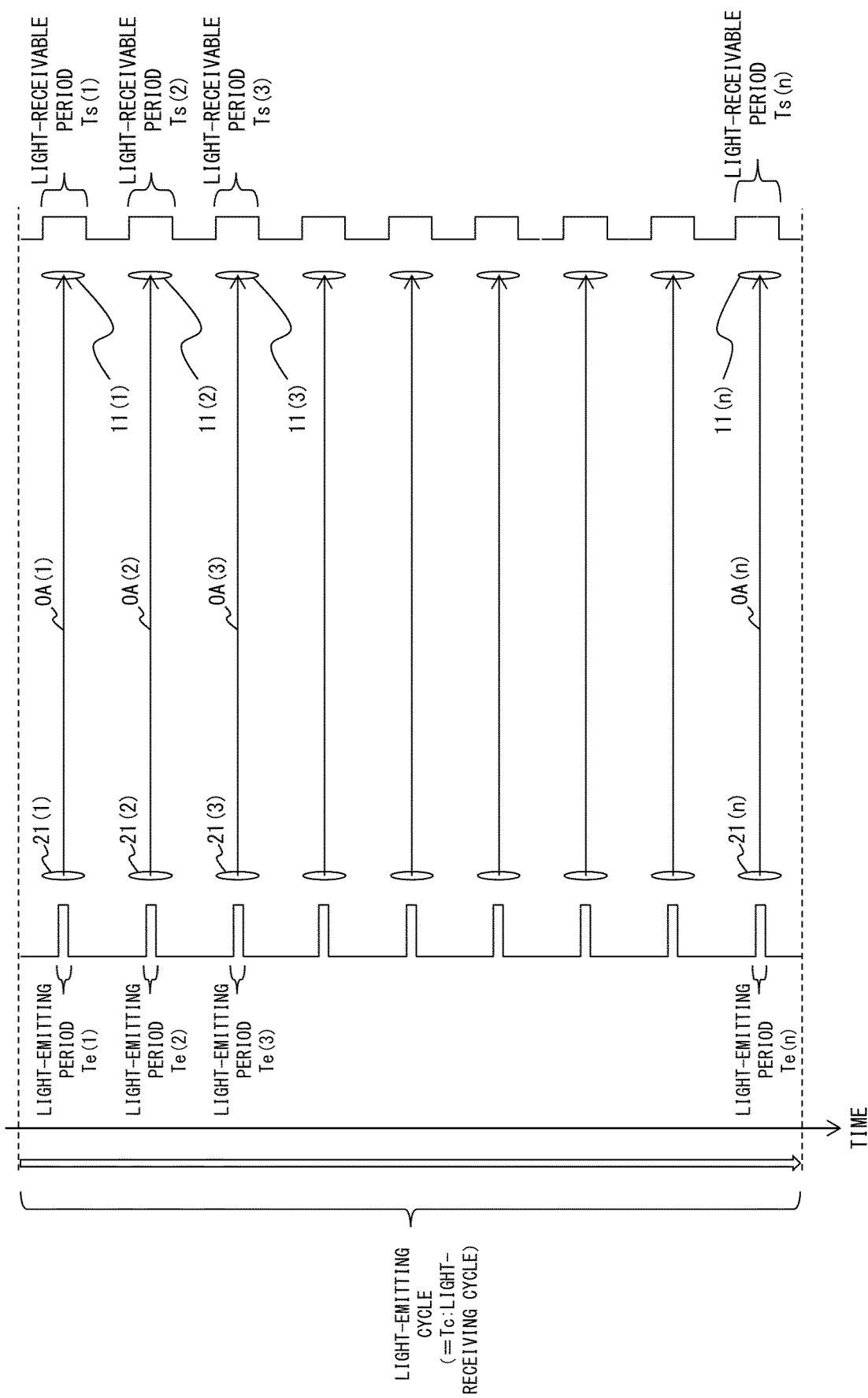
FIG. 3 is a chart showing, for example, timing of light emitting and receiving processes, which are cyclically carried out by the multiple optical-axis photoelectric sensor illustrated in FIG. 2.

FIG. 3 is a chart showing, for example, timing of light emitting and receiving processes, which are cyclically carried out by the multiple optical-axis photoelectric sensor 1. In the multiple optical-axis photoelectric sensor 1, the light-emitting element 21 and the light-receiving element 11 operate in sync with each other in a predetermined cycle. In other words, the multiple optical-axis photoelectric sensor 1 causes the plurality of light-emitting elements 21 to emit light sequentially in turns in respective light-emitting periods Te. Further, the multiple optical-axis photoelectric sensor 1 causes each of the plurality of light-receiving elements 11 corresponding to the plurality of light-emitting elements 21, respectively, to carry out a light-receiving process in a light-receivable period Ts in sync with a corresponding light-emitting period Te of each of the plurality of light-emitting elements 21. More specifically, the multiple optical-axis photoelectric sensor 1 carries out the light emitting and receiving processes in the predetermined cycle, while causing the light-emitting period Te of the light-emitting element 21 and the light-receivable period Ts (i.e., a received light sampling period) of the light-receiving element 11 to synchronize with each other at each of the plurality of optical axes OA. The multiple optical-axis photoelectric sensor 1 thereby monitors whether or not any object intruded in the detection region R, by carrying out the light emitting/receiving process.

The light-emitting elements 21(1) through 21(n) of the light emitter 20 carry out light-emitting processes sequentially in turns in the light-emitting periods Te(1) through Te(n), respectively. The light-receiving elements 11(1) through 11(n) of the light receiver 10 carry out light-receiving processes sequentially in turns in respective light-receivable periods Ts(1) through Ts(n) of the light-receiving elements 11(1) through 11(n), in sync with the light-emitting periods Te of the light-emitting elements 21 corresponding to the light-receiving elements 11(1) through 11(n), respectively. The light-emitting periods Te(1) through Te(n) and the light-receivable periods Ts(1) through Ts(n) correspond to each other, respectively, that is, are in sync with each other, respectively.

Note that in the following description, in a case where each of the light-emitting periods Te needs to be distinguished from the other light-emitting periods Te, an index such as "(1)", "(2)", "(3)", . . . , or "(n)" is appended for distinction with respect to the reference sign. In a case where there is no need to distinguish each of the light-emitting periods Te from the other light-emitting periods Te, the expression "light-emitting period(s) Te" is simply used. Similarly, in a case where each of the light-receivable periods Ts needs to be distinguished from the other light-receivable periods Ts, an index such as "(1)", "(2)", "(3)", . . . , or "(n)" is appended for distinction with respect to the reference sign. In a case where there is no need to distinguish each of the light-receivable periods Ts from the other light-receivable periods Ts, the expression "light-receivable period(s) Ts" is simply used.

In the present specification, a time necessary for all the light-emitting elements 21(1) through 21(n) of the light emitter 20 to carry out respective light-emitting processes once, that is, a cycle for execution of sequential light-emitting processes of the light emitter 20 is referred to as a "light-emitting cycle". Then, as in an example shown in FIG. 3, the light-emitting periods Te(1) through Te(n) of the light-emitting elements 21(1) through 21(n) are arranged in one light-emitting cycle so as not overlap with each other.

Similarly, a time necessary for all the light-receiving elements 11(1) through 11(n) of the light receiver 10 to carry out respective light-receiving processes once, that is, a cycle for execution of sequential light-receiving processes of the light receiver 10 is referred to as a "light-receiving cycle Tc". The light-emitting cycle is identical to the light-receiving cycle Tc. Then, as in the example shown in FIG. 3, the respective light-receivable periods Ts(1) through Ts(n) of the light-receiving elements 11(1) through 11(n) are arranged in one light-receiving cycle Tc so as not to overlap with each other.

As shown in FIG. 3, (i) the light-emitting elements 21(1) through 21(n) carry out respective light-emitting processes sequentially in turns and (ii) the light-receiving elements 11(1) through 11(n) carry out respective light-receiving processes sequentially in turns, in a direction from a first light-emitting element/first light-receiving element at one end to a last light-emitting element/last light-receiving element at the other end in an alignment of the light-emitting elements 21(1) through 21(n) and the light-receiving elements 11(1) through 11(n). In other words, the light-emitting periods Te(1) through Te(n) are arranged in sequence in one light-emitting cycle so as not to overlap with each other. Further, the light-receivable periods Ts(1) through Ts(n) corresponding to the light-emitting periods Te(1) through Te(n), respectively, are arranged in sequence in one light-receiving cycle Tc so as not to overlap with each other. In the multiple optical-axis photoelectric sensor 1, the light emitting and receiving processes, that is, the light-emitting process of the light-emitting element 21 and the light-receiving process of the light-receiving element 11 are repeatedly carried out in a light-emitting cycle (i.e., the light-receiving cycle Tc).

(Overview of Configuration of Multiple Optical-Axis Photoelectric Sensor)

The following will discuss in detail the multiple optical-axis photoelectric sensor 1, the overview of which has been described above. For easy understanding of the multiple optical-axis photoelectric sensor 1, the overview of the multiple optical-axis photoelectric sensor 1 is summarized as follows.

That is, the multiple optical-axis photoelectric sensor 1, in particular, the light receiver 10 (determining device) is a determining device which determines a cause of abnormality in output of the light-receiving element 11 in the multiple optical-axis photoelectric sensor 1. The light receiver 10 includes: a first determining section 120 configured to determine whether or not abnormality in output occurred, with regard to each of respective light-receivable periods Ts of the light-receiving elements 11, the light-receivable periods Ts being arranged in one light-receiving cycle Tc (one cycle) so as not to overlap with each other; and a second determining section 130 configured to (1) determine that electrical noise occurred, in a case where, with regard to each of adjacent light-receivable periods Ts among the light-receivable periods Ts in the light-receiving cycle Tc, the first determining section 120 has determined that the abnormality in output occurred, or (2) determine that disturbance light noise occurred, in a case where, with regard to one light-receivable period Ts or two or more non-adjacent light-receivable periods Ts among the light-receivable periods Ts in the light-receiving cycle Tc, the first determining section 120 has determined that the abnormality in output occurred.

In the above configuration, the light receiver 10 determines that (1) electrical noise occurred, in a case where abnormality in output is found in each of adjacent light-receivable periods Ts in one light-receiving cycle Tc. Further, the light receiver 10 determines that (2) disturbance light noise occurred, in a case where abnormality in output is found in one light-receivable period Ts or two or more non-adjacent light-receivable periods Ts in the one light-receiving cycle Tc.

This advantageously allows the light receiver 10 to determine whether a cause of abnormality in output of the light-receiving element 11 is the occurrence of electrical noise or the occurrence of disturbance light noise.

In the light receiver 10, the light-receivable periods Ts are arranged to correspond to the light-emitting periods Te, respectively. With regard to each of the plurality of light-receivable periods Ts in one light-receiving cycle Tc, the first determining section 120 determines that abnormality in output occurred, in a case where an output exceeds a predetermined value in a period excluding, from the each of the plurality of light-receivable periods Ts, a corresponding one of the light-emitting periods Te (i.e., abnormality detection period Td). For example, in a case where the light-receiving element 11 detects and holds a peak of a received light signal, the abnormality detection period Td can be a "period from the start of a light-receivable period Ts to the start of a corresponding light-emitting period Te".

In the above configuration, with regard to each of the plurality of light-receivable periods Ts, the light receiver 10 determines that abnormality in output occurred, in a case where an output exceeds the predetermined value in a period excluding, from the each of the plurality of light-receivable periods Ts, a corresponding light-emitting period Te. In the light-emitting period Te, the output suddenly increases since the light-receiving element 11 receives light which has been emitted from the light-emitting element.

Therefore, by "determining that abnormality in output occurred, in a case where an output exceeds the predetermined value in a period excluding, from a light-receivable period Ts, a corresponding light-emitting period Te", the light receiver 10 advantageously makes it possible to improve the accuracy of determination on whether or not abnormality in output occurred.

The light receiver 10 further includes a storing section 140 configured to store, in a storage section 200 (in particular, output data table 210), outputs in light-receivable periods Ts in which electrical noise occurred according to a result of determination by the second determining section 130.

In the above configuration, the light receiver 10 stores, in the output data table 210, the outputs in the light-receivable periods Ts in which electrical noise occurred according to the result of determination by the second determining section 130. Therefore, the light receiver 10 advantageously allows a user to check the outputs of the light-receiving elements 11 which outputs were made at the time when the electrical noise occurred.

The light receiver 10 further includes a notifying section 300 configured to differently notify a user of (1) a case where it has been determined by the second determining section 130 that the electrical noise occurred or (2) a case where it has been determined by the second determining section 130 that the disturbance light noise occurred.

In the above configuration, the light receiver 10 differently notifies a user of (1) a case where the electrical noise occurred or (2) a case where the disturbance light noise occurred.

This advantageously allows the light receiver 10 to notify a user whether abnormality in output of the light-receiving element 11 is caused by electrical noise or disturbance light noise.

The light receiver 10 further includes a filtering section 160 configured to remove the electrical noise which caused the abnormality in output, in a case where it has been determined by the second determining section 130 that the electrical noise occurred.

In the above configuration, the light receiver 10 removes the electrical noise which was a cause of abnormality in output of the light-receiving element 11, in a case where it has been determined that the electrical noise occurred. Therefore, the light receiver 10 advantageously makes it possible to restore the output of the light-receiving element 11 to a normal state by removing the electrical noise which caused the abnormality in output, in a case where the occurrence of the electrical noise resulted in the abnormality in output of the light-receiving element 11.

The multiple optical-axis photoelectric sensor 1 includes the light receiver 10. In the above configuration, the multiple optical-axis photoelectric sensor 1 determines that (1) electrical noise occurred, in a case where abnormality in output is found in each of adjacent light-receivable periods Ts in one light-receiving cycle Tc. On the other hand, the multiple optical-axis photoelectric sensor 1 determines that (2) disturbance light noise occurred, in a case where abnormality in output is found in one light-receivable period Ts or two or more non-adjacent light-receivable periods Ts in the one light-receiving cycle Tc.

This advantageously allows the multiple optical-axis photoelectric sensor 1 to determine whether a cause of abnormality in output of the light-receiving element 11 is the occurrence of electrical noise or the occurrence of disturbance light noise.

The above has discussed the overview of the multiple optical-axis photoelectric sensor 1 (in particular, the light receiver 10). The following will discuss in detail the light receiver 10 of the multiple optical-axis photoelectric sensor 1, with reference to FIG. 1 etc.

(Details of Multiple Optical-Axis Photoelectric Sensor)

Figure 1:
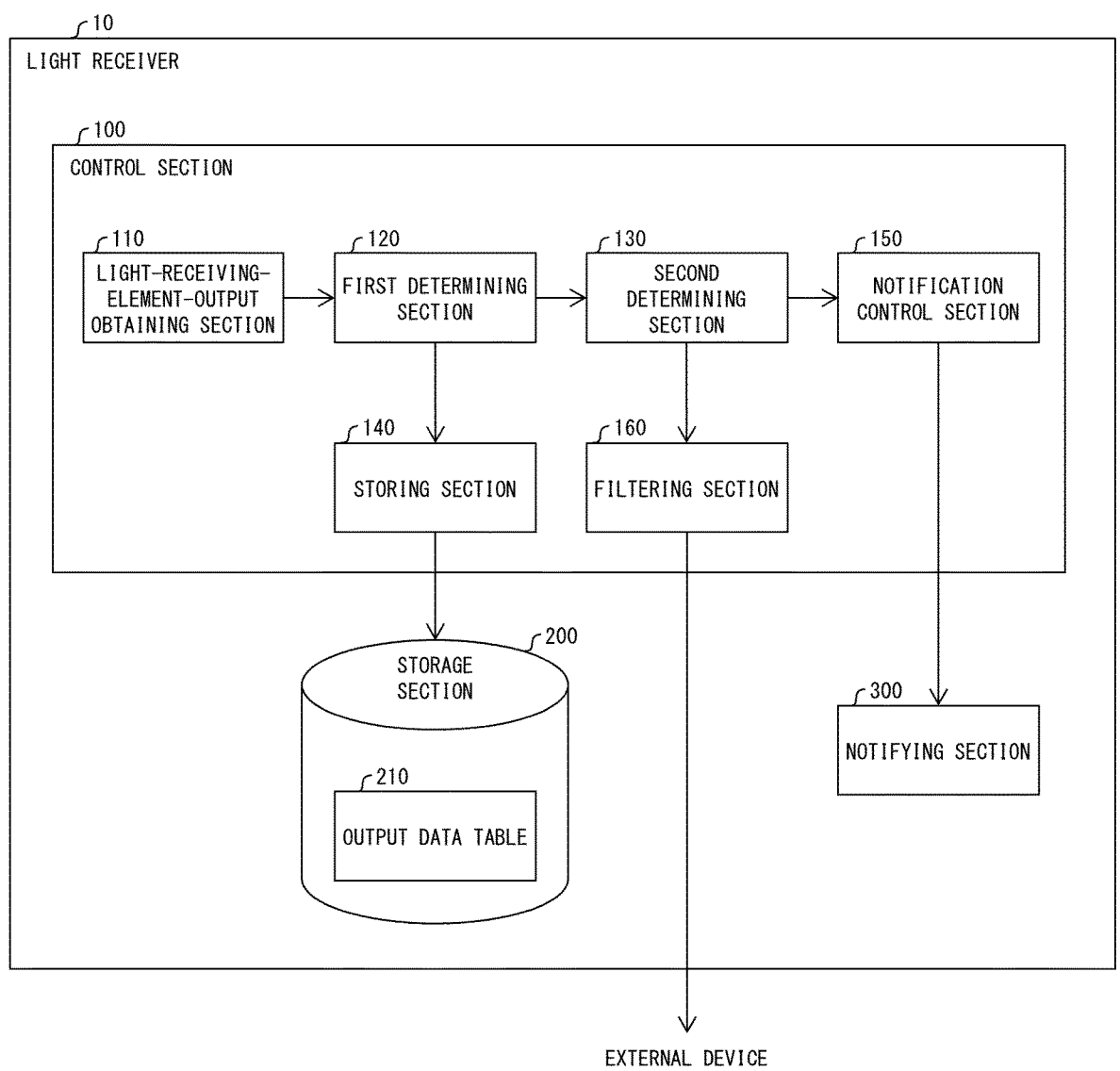
FIG. 1 is a functional block diagram illustrating a main part configuration of a light receiver of a multiple optical-axis photoelectric sensor in accordance with Embodiment 1 of the present invention.

FIG. 1 is a functional block diagram illustrating a main part configuration of the light receiver 10. Note that with parts which is not directly relevant to the present embodiment (e.g., a configuration in which a plurality of light-receivable periods Ts are arranged in sequence in one light-receiving cycle Tc so as not to overlap with each other and so as to be each synchronized with a corresponding one of a plurality of light-emitting periods Te) are omitted from the following description and the functional block diagram. Note, however, that the light receiver 10 can include a configuration(s) which is/are thus omitted, depending on actual conditions of implementation.

The light receiver 10 includes a control section 100, a storage section 200, and a notifying section 300. The control section 100 carries out overall control of each section of the light receiver 10. The storage section 200 stores therein various data which are used by the light receiver 10. The notifying section 300 notifies a user of a "cause of abnormality in output of the light-receiving element 11", which cause has been determined by the control section 100.

(Details of Functional Blocks Other than Storage Section)

The notifying section 300 notifies a user of a cause of abnormality in output of the light-receiving element 11, under control by the control section 100 (in particular, notification control section 150). More specifically, the notifying section 300 notifies a user "whether a cause of abnormality in output of the light-receiving element 11 is electrical noise (disturbance voltage) or disturbance light", differently depending on the cause. The notifying section 300 can be, for example, an indicator light (notifying lamp) realized by a light emission diode (LED), which indicator light is configured to blink in a case where "the cause of the abnormality in output of the light-receiving element 11 is electrical noise" or to light up without blinking in a case where "the cause of the abnormality in output of the light-receiving element 11 is disturbance light". Alternatively, the notifying section 300 can be realized by use of, for example, LEDs of three colors. Then, the notifying section 300 can notify a user "whether the cause of the abnormality in output of the light-receiving element 11 is electrical noise or disturbance light", in different colors depending on the cause. The notifying section 300 need only be capable of notifying a user "whether the cause of the abnormality in output of the light-receiving element 11 is electrical noise or disturbance light", differently depending on the cause. How the cause is notified to a user differently depending on the cause is not particularly limited.

The control section 100 is configured to carry out overall control of processes which are carried out by the light receiver 10. The control section 100 illustrated in FIG. 1 includes, as functional blocks, a light-receiving-element-output obtaining section 110, the first determining section 120, the second determining section 130, the storing section 140, the notification control section 150, and the filtering section 160. The functional blocks of the control section 100 described above can be realized by, for example, a central processing unit (CPU) loading onto a random access memory (RAM; not shown) a program stored in a storage device (storage section 200) that is in the form of, for example, a read-only memory (ROM) or a non-volatile random access memory (NVRAM). The details of the control section 100 will be described below.

The light-receiving-element-output obtaining section 110 obtains, from the plurality of light-receiving elements 11, respective outputs in the light-receivable periods Ts arranged in sequence in one light-receiving cycle Tc. In particular, the light-receiving-element-output obtaining section 110 obtains respective outputs in abnormality detection periods Td. The "abnormality detection periods Td" each are a "period excluding, from each of the plurality of light-receivable periods Ts, a corresponding one of the plurality of light-emitting periods Te". The "abnormality detection period Td" is, for example, a "period from the start of a light-receivable period Ts to the start of a light-emitting period Te corresponding to the light-receivable period Ts".

The light-receiving-element-output obtaining section 110 obtains, for example, an output in an abnormality detection period Td(1) of the light-receiving element 11(1), an output in an abnormality detection period Td(2) of the light-receiving element 11(2), and an output in an abnormality detection period Td(3) of the light-receiving element 11(3). Similarly, the light-receiving-element-output obtaining section 110 obtains, for example, an output in an abnormality detection period Td(n) of the light-receiving element 11(*n*). Then, the light-receiving-element-output obtaining section 110 notifies the first determining section 120 of the "respective outputs in the abnormality detection periods Td" which outputs have been obtained from all the light-receiving elements 11, respectively, that is, respective outputs in all the light-receivable periods Ts (abnormality detection periods Td) in the one light-receiving cycle Tc.

Then, the first determining section 120 determines whether "abnormality in output is occurring", with regard to each of all the light-receivable periods Ts in the one light-receiving cycle Tc, and notifies the second determining section 130 of a result of determination. Having determined that an "output of the light-receiving element 11 in an abnormality detection period Td" exceeds a predetermined value, the first determining section 120 determines that abnormality in output is occurring in a light-receivable period Ts corresponding to the abnormality detection period Td.

The first determining section 120 determines, for example, whether each of the "respective outputs in the abnormality detection periods Td" in the one light-receiving cycle exceeds the predetermined value, which outputs are obtained from the light-receiving-element-output obtaining section 110. Then, the first determining section 120 notifies the second determining section 130 of a result of determination. More specifically, the first determining section 120 determines whether each of the output in the abnormality detection period Td(1) of the light-receiving element 11(1), the output in the abnormality detection period Td(2) of the light-receiving element 11(2), and the output in the abnormality detection period Td(3) of the light-receiving element 11(3) exceeds the predetermined value. Similarly, the first determining section 120 determines whether the output in the abnormality detection period Td(n) of the light-receiving element 11(*n*) exceeds the predetermined value. Having determined that an output of a light-receiving element 11(*m*) exceeds the predetermined value, the first determining section 120 determines that abnormality in output is occurring in a light-receivable period Ts(m) corresponding to the abnormality detection period Td(m).

The first determining section 120 also notifies the storing section 140 of the output of the light-receiving element 11 in the light-receivable period Ts corresponding to the abnormality detection period Td in which "abnormality in output occurred" according to a result of determination by the first determining section 120. Having determined that the output in the abnormality detection period Td(m) of the light-receiving element 11(*m*) exceeds the predetermined value, the first determining section 120 notifies the storing section 140 of the output of the light-receiving element 11(*m*) in the light-receivable period Ts(m) corresponding to the abnormality detection period Td(m).

The second determining section 130 determines a cause of the abnormality in output of the light-receiving element 11 in the light-receivable period Ts in which "abnormality in output occurred" according to the result of determination by the first determining section 120. Then, the second determining section 130 notifies the notification control section 150 and the filtering section 160 of a result of determination by the second determining section 130. The second determining section 130 may further notify the storing section 140 of the result of determination regarding the cause of the abnormality in output of the light-receiving element 11.

The second determining section 130 determines that electrical noise occurred, in a case where (i) in one light-receiving cycle Tc, there are a plurality of light-receivable periods Ts in each of which "abnormality in output occurred" according to the result of determination by the first determining section 120 and (ii) these light-receivable periods Ts are adjacent to each other (consecutive) in the one light-receiving cycle Tc. In other words, the second determining section 130 determines that (1) electrical noise occurred, in a case where with regard to two or more adjacent light-receivable periods Ts in one light-receiving cycle Tc, the first determining section 120 has determined that abnormality in output occurred.

The second determining section 130 determines that disturbance light noise occurred, in a case where, in one light-receiving cycle Tc, there is only one light-receivable period Ts in which "abnormality in output occurred" according to the result of determination by the first determining section 120. On the other hand, the second determining section 130 determines that disturbance light noise occurred, in a case where (i) in one light-receiving cycle Tc, there are a plurality of light-receivable periods Ts in each of which "abnormality in output occurred" according to the result of determination by the first determining section 120, and (ii) these light-receivable periods Ts are not adjacent to each other in the one light-receiving cycle Tc. In other words, the second determining section 130 determines that (2) disturbance light noise occurred, in a case where in one light-receivable period Ts or two or more non-adjacent light-receivable periods Ts in one light-receiving cycle Tc, abnormality in output occurred according to the result of determination by the first determining section 120.

For example, the second determining section 130 carries out the following process, in a case where the first determining section 120 has determined that the "output of the light-receiving element 11(*m*) in the abnormality detection period Td(m) is larger than the predetermined value (that is, abnormality in output occurred in the light-receivable period Ts(m))". That is, the second determining section 130 determines whether at least one of (i) an "output of a light-receiving element 11(*m*+1) in an abnormality detection period Td(m+1)" and (ii) an "output of a light-receiving element 11(*m*−1) in an abnormality detection period Td(m−1)" is larger than the predetermined value according to the result of determination by the first determining section 120. In other words, the second determining section 130 determines "whether the first determining section 120 has determined that 'abnormality in output occurred in at least one of the light-receivable period Ts(m+1) and the light-receivable period Ts(m−1)'".

In a case where the first determining section 120 has determined that "abnormality in output occurred in the light-receivable period Ts(m)" and "abnormality in output occurred in at least one of the light-receivable period Ts(m+1) and the light-receivable period Ts(m−1)", the second determining section 130 determines that electrical noise occurred. On the other hand, in a case where the first determining section 120 has determined that "abnormality in output occurred in the light-receivable period Ts(m)" but "abnormality in output occurred in neither the light-receivable period Ts(m+1) nor the light-receivable period Ts(m−1)", the second determining section 130 determines that disturbance light noise occurred.

The second determining section 130 notifies the notification control section 150 of a result of determination regarding the cause of the abnormality in output. Further, the second determining section 130 notifies the filtering section 160 and the storing section 140 of "outputs in adjacent light-receivable periods Ts in one light-receiving cycle Tc"

in which "abnormality in output occurred" according to the result of determination by the first determining section 120.

For example, in a case where with regard to each of light-receivable periods Ts(m) and Ts(m+1) in one light-receiving cycle Tc, the first determining section 120 has determined that "abnormality in output occurred", the second determining section 130 notifies the notification control section 150 of a result of determination that "electrical noise occurred". Further, the second determining section 130 notifies the filtering section 160 and the storing section 140 of the "outputs in the adjacent light-receivable periods Ts(m) and Ts(m+1)" in which "abnormality in output occurred" according to the result of determination by the first determining section 120.

The storing section 140 stores, in the output data table 210, the outputs of the light-receiving elements 11 in the light-receivable periods Ts in which "abnormality in output occurred" according to the result of determination by the first determining section 120. In particular, the storing section 140 stores, in the storage section 200, the outputs in the light-receivable periods Ts in which electrical noise occurred according to the result of determination by the second determining section 130.

For example, in a case where (i) the first determining section 120 has determined that "the output of the light-receiving element 11(m) in the abnormality detection period Td(m) exceeds the predetermined value" and further (ii) the second determining section 130 has determines that this occurred due to electrical noise, the storing section 140 carries out the following process. That is, the storing section 140 stores, in the output data table 210, the output of the light-receiving element 11(m) in the light-receivable period Ts(m). Note that the storing section 140 may store, in the storage section 200, an output in a light-receivable period Ts in which disturbance light occurred according to a result of determination by the second determining section 130.

The notification control section 150 controls the notifying section 300, and causes the notifying section 300 to notify a user of the cause of the abnormality in output of the light-receiving element 11 which cause has been determined by the second determining section 130. The notification control section 150 causes the notifying section 300 to notify the user whether the cause of abnormality in output of the light-receiving element 11 is electrical noise or disturbance light noise.

Having been notified by the second determining section 130 of the result of determination that "electrical noise occurred", the filtering section 160 removes the electrical noise which was the cause of the abnormality in output of the light-receiving element 11 and outputs, to an external device or the like, an output signal of the light-receiving element 11 from which output signal the electrical noise has been removed.

For example, in a case where with regard to both of adjacent light-receivable periods Ts(m) and Ts(m+1) in one light-receiving cycle Tc, the first determining section 120 has determined that "abnormality in output occurred", the second determining section 130 determines that "electrical noise occurred". Further, the second determining section 130 notifies the filtering section 160 of "outputs in the adjacent light-receivable periods Ts(m) and Ts(m+1)" in which "abnormality in output occurred" according to the result of determination by the first determining section 120. The filtering section 160 identifies electrical noise which is occurring, from those respective outputs in the abnormality detection periods Td(m) and Td(m+1) of the light-receivable periods Ts(m) and Ts(m+1). Then, the filtering section 160 removes the electrical noise thus identified, from the respective outputs of the light-receivable periods Ts(m) and Ts(m+1). Note that since the filtering section 160 can be realized by using a conventional software filter, details of how the filtering section 160 removes electrical noise which caused abnormality in output of the light-receiving element 11, and the like will be omitted.

(Details of Storage Section)

The storage section 200 stores therein various kinds of data (e.g., programs and various parameters necessary for an operation of the multiple optical-axis photoelectric sensor 1, which programs and various parameters have been configured and adjusted by an external configuration device (tool)) which are used by the light receiver 10. The storage section 200 stores (1) a control program, (2) an OS program, and (3) an application program for executing various functions, which programs are executed by the control section 100 of the light receiver 10, and (4) various data which are read out when the application program is executed. Further, in the storage section 200, the output data table 210 is stored. This will be described later in detail. The above data (1) to (4) are stored in a non-volatile storage device such as a read only memory (ROM), a flash memory, an erasable programmable ROM (EPROM), an electrically EPROM (EEPROM) (Registered Trademark), a hard disc drive (HDD), or the like.

The light receiver 10 can include a temporary storage section (not shown). The temporary storage section is a so-called working memory configured to temporarily store (i) data that the light receiver 10 uses for operations in carrying out various processes and (ii) the results of the operations. The temporary storage section includes a volatile storage device such as a random access memory (RAM). What data is to be stored in what storage device is determined as appropriate in view of the purpose of use of the light receiver 10, convenience, cost, physical constraint, and/or the like.

The storing section 140 stores, in the output data table 210, the outputs of the light-receiving elements 11 in the light-receivable periods Ts in which electrical noise occurred according to the result of determination of the second determining section 130. It is possible to further store, in the output data table 210, an output of the light-receiving element 11 in a light-receivable period Ts in which disturbance light occurred according to a result of determination of the second determining section 130.

Figure 4:
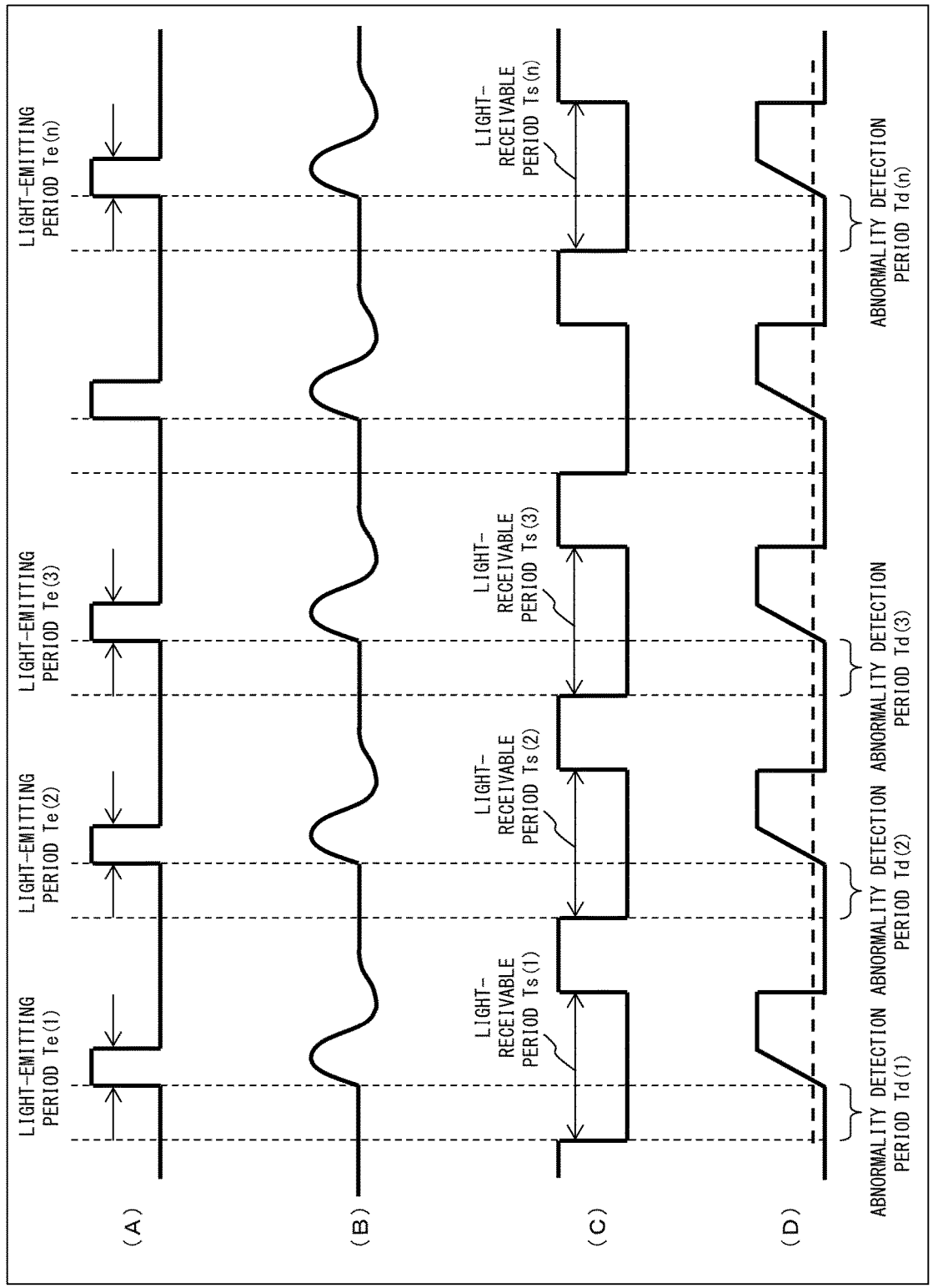
FIG. 4 is a chart illustrating outputs of light-receiving elements in the light receiver illustrated in FIG. 1 in a case where no noise is occurring.
Figure 5:
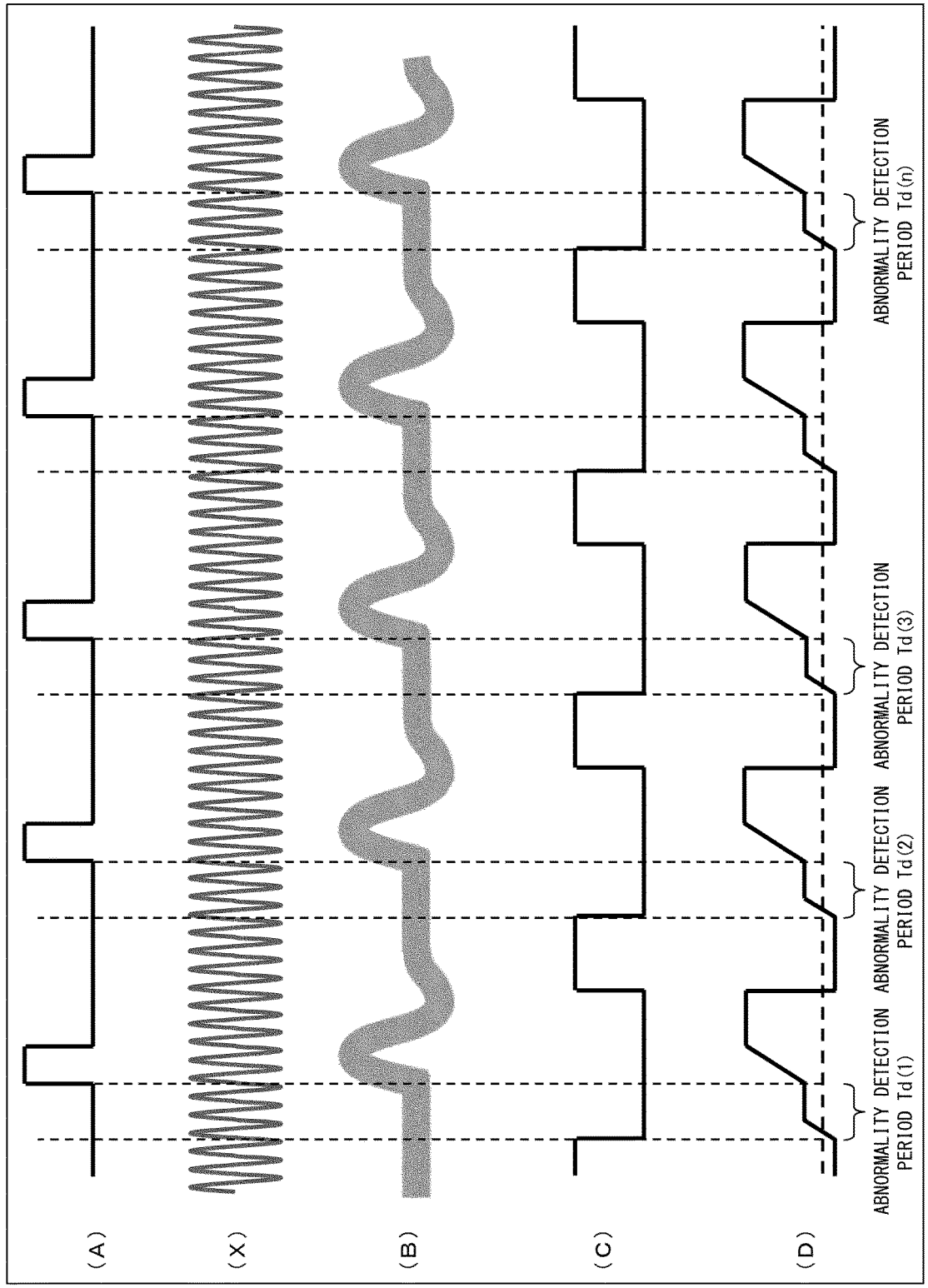
FIG. 5 is a chart illustrating outputs of the light-receiving elements in the light receiver illustrated in FIG. 1 in a case where electrical noise is occurring.
Figure 6:
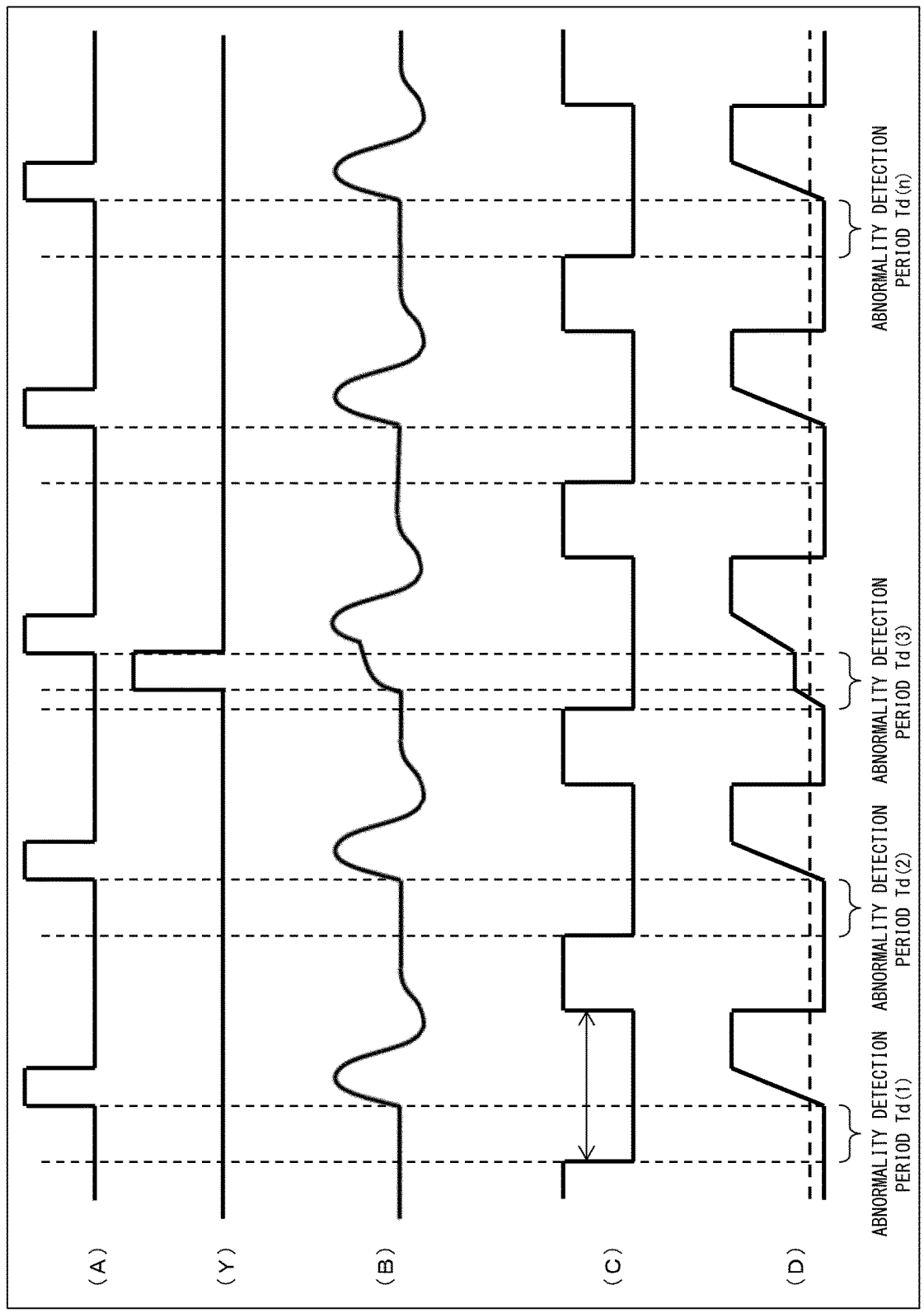
FIG. 6 is a chart illustrating outputs of the light-receiving elements in the light receiver illustrated in FIG. 1 in a case where disturbance light is occurring.

(Examples of Outputs of Light-Receiving Elements) The following will describe outputs of the light-receiving elements 11 in each of (i) a case where no noise (neither electrical noise nor disturbance light) is occurring, (ii) a case where electrical noise is occurring, and (iii) a case where disturbance light is occurring, with reference to FIGS. 4, 5, and 6.

(Case where No Noise is Occurring)

FIG. 4 is a chart illustrating outputs of the light-receiving elements 11 in a case where no noise (neither electrical noise nor disturbance light) is occurring. (A) of FIG. 4 shows light-emitting periods Te of respective light-emitting elements 21, which light-emitting periods Te are arranged in one light-emitting cycle so as not to overlap with each other. (B) of FIG. 4 shows an image of received light signals which are received by respective light-receiving elements 11, in one light-emitting cycle. In the case where no noise (neither electrical noise nor disturbance light) occurs, the received light signals, which are received by the respective light-receiving elements 11, are identical to light (light signals), which has been emitted by respective light-emitting elements 21(1) through 21(n) in light-emitting periods Te(1) through Te(n) shown as an example in (A) of FIG. 4.

(C) of FIG. 4 shows a plurality of light signal reception times (i.e., light-receivable periods Ts), which are arranged in one light-receiving cycle so as not to overlap with each other. Specifically, (C) of FIG. 4 shows light-receivable periods Ts(1) through Ts(n). The light-receivable periods Ts(1) through Ts(n) correspond to the light-emitting periods Te(1) through Te(n), respectively. In other words, the light-receivable periods Ts(1) through Ts(n) are synchronized with the light-emitting periods Te(1) through Te(n), respectively. The light-receiving elements 11(1) through 11(n) receive, in the light-receivable periods Ts(1) through Ts(n), light (light signals) which has been emitted by the light-emitting elements 21(1) through 21(n) in the light-emitting periods Te(1) through Te(n), respectively. (D) of FIG. 4 shows signals (processed received light signals) which are outputted by the light-receiving elements 11(1) through 11(n), respectively, in one light-receiving cycle Tc. As shown in (D) of FIG. 4, the light-receiving elements 11(1) through 11(n) output, respectively, signals (processed received light signals) corresponding to the light (light signals) which have been received in the light-receivable periods Ts(1) through Ts(n). In (D) of FIG. 4, a dotted line indicates an "ON threshold value (predetermined value)", which serves as a criteria for determining, by the multiple optical-axis photoelectric sensor 1 (in particular, the first determining section 120), whether or not abnormality in output is occurring.

In the light-receivable periods Ts(1) through Ts(n), abnormality detection periods Td(1) through Td(n) are set, respectively. The abnormality detection periods Td(1) through Td(n) are each a "period excluding, from each of the light-receivable periods Ts(1) through Ts(n), a corresponding one of the light-emitting periods Te(1) through Te(n)". In a case where the light-receiving element 11 detects and holds a peak of a received light signal, the abnormality detection period Td is a "period from the start of a light-receivable period Ts to the start of a corresponding light-emitting period Te".

Here, determining that an "output of a light-receiving element 11 in an abnormality detection period Td" exceeds the ON threshold value (predetermined value)", the first determining section 120 determines that abnormality in output is occurring in a light-receivable period Ts corresponding to the abnormality detection period Td. As shown in (D) of FIG. 4, in a case where no noise (neither electrical noise nor disturbance light) is occurring, outputs (processed received light signal) of the respective light-receiving elements 11(1) through 11(n) in the abnormality detection periods Td(1) through Td(n) are not more than ON threshold value.

(Case where Electrical Noise is Occurring)

FIG. 5 is a chart illustrating outputs of the light-receiving elements 11 in a case where electrical noise is occurring. (A) of FIG. 5, like (A) of FIG. 4, shows light-emitting periods Te(1) through Te(n) which are arranged in one light-emitting cycle so as not to overlap with each other. (X) of FIG. 5 shows an image of electrical noise. (B) of FIG. 5 shows an image of received light signals which are received by the respective light-receiving elements 11 in one light-emitting cycle in a case where the electrical noise is occurring. As shown in (B) of FIG. 5, the image of the received light signals, on which the electrical noise (disturbance voltage) is superimposed, are thicker (wider) than the "image of the light (light signals) emitted by the light-emitting elements 21" shown in (B) of FIG. 4, since signals of the electrical noise are superimposed. The image of the received light signals, on which the electrical noise (disturbance voltage) is superimposed, have an increased width of a curve indicative of signals, as compared to the image (i.e., the image shown in (B) of FIG. 4) of the received light signals, which are received by the light-receiving elements 11 under a condition where no noise is occurring.

(C) of FIG. 5, like (C) of FIG. 4, shows light-receivable periods Ts(1) through Ts(n) which are provided in one light-receiving cycle Tc. (D) of FIG. 5 shows signals (processed received light signals) which are outputted by the respective light-receiving elements 11(1) through 11(n) in the one light-receiving cycle Tc, in a case where the electrical noise is occurring. Although both of (D) of FIG. 4 and (D) of FIG. 5 show signals corresponding to light which are received by the respective light-receiving elements 11(1) through 11(n) in the light-receivable periods Ts(1) through Ts(n), the signals shown in (D) of FIG. 5 differ from the signals shown in (D) of FIG. 4 in the following point.

That is, as compared to the processed received light signals in the abnormality detection periods Td in (D) of FIG. 4, the processed received light signals each increase in output value due to the electrical noise in "a period from the start of a light-receivable period Ts to the start of a corresponding light-emitting period Te (that is, abnormality detection period Td)" in (D) of FIG. 5. In (D) of FIG. 5, the outputs (processed received light signals) of the respective light-receiving elements 11(1) through 11(n) are larger than the "ON threshold value (predetermined value)" which is indicated by a dotted line in the abnormality detection periods Td(1) through Td(n).

The developer of the multiple optical-axis photoelectric sensor 1 has found that in a case where electrical noise is present, "an increase in processed received light signal in the abnormality detection period Td (that is, a phenomenon in which a signal outputted by the light-receiving element 11 becomes larger) occurs at many optical axes". In other words, the developer of the multiple optical-axis photoelectric sensor 1 has found that in a case where electrical noise is present, there occurs a phenomenon in which "the processed received light signal increases in value in the abnormality detection period Td" at many optical axes which may not necessarily be all optical axes.

In light of the above, the multiple optical-axis photoelectric sensor 1 is configured to determine that "electrical noise occurs" in a case where "processed received light signals increase in a plurality of consecutive abnormality detection periods Td which are provided in one light-receiving cycle Tc". In other words, the multiple optical-axis photoelectric sensor 1 is configured to determine that "electrical noise occurs" in a case where processed received light signals (outputs of the light-receiving elements 11) are larger than the ON threshold value (predetermined value) in respective abnormality detection periods Td of light-receivable periods Ts which are adjacent to each other in one light-receiving cycle Tc.

(Case where Disturbance Light is Occurring)

FIG. 6 is a chart illustrating outputs of the light-receiving elements 11 in a case where disturbance light occurred. (A) of FIG. 6, like (A) of FIG. 4 and (A) of FIG. 5, shows light-emitting periods Te(1) through Te(n) which are arranged in one light-emitting cycle so as not to overlap with each other. (Y) of FIG. 6 shows an image of disturbance light (optical noise). (B) of FIG. 6 shows an image of received light signals which are received by the respective light-receiving elements 11 in one light-emitting cycle in a case where disturbance light occurred.

As shown in (B) of FIG. 6, the image of the received light signals has a portion on which the disturbance light shown in (Y) of FIG. 6 is superimposed, and the image has a larger signal value at that portion as compared to the "image of the light (light signals) emitted by the light-emitting elements 21" shown in (B) of FIG. 4. On the other hand, in (Y) of FIG. 6, the image of received light signals at portions excluding the portion on which the disturbance light is superimposed is similar to the "image of the light (light signals) emitted by the light-emitting elements 21" shown in (B) of FIG. 4. That is, in a case where disturbance light occurred, only a received light signal at a time point when the disturbance light occurred (received light signal at the portion on which the disturbance light is superimposed) changes (specifically, the received light signal becomes larger). Meanwhile, no influence of the disturbance light appears on received light signals at the other time points.

(C) of FIG. 6, like (C) of FIG. 4 and (C) of FIG. 5, shows the light-receivable periods Ts(1) through Ts(n) which are provided in one light-receiving cycle Tc. (D) of FIG. 6 shows signals (processed received light signals) which are outputted by the light-receiving elements 11(1) through 11(n), respectively, in the one light-receiving cycle Tc, in a case where the disturbance light occurred. Although both of (D) of FIG. 4 and (D) of FIG. 6 show signals corresponding to light which is received by the respective light-receiving elements 11(1) through 11(n) in the light-receivable periods Ts(1) through Ts(n), the signals shown in (D) of FIG. 6 differ from the signals shown in (D) of FIG. 4 in the following point.

That is, as compared to the processed received light signal in the abnormality detection period Td(3) in (D) of FIG. 4, the processed received light signal increases in output value by the disturbance light in the "abnormality detection period Td(3) (that is, a period from the start of the light-receivable period Ts(3) to the start of the light-emitting period Te(3)") in (D) of FIG. 6. That is, since the disturbance light which occurred in the abnormality detection period Td(3) is superimposed on the processed received light signal, the processed received light signal increases in value by the disturbance light superimposed in the "abnormality detection period Td(3)" in (D) of FIG. 6, as compared to the processed received light signal in the abnormality detection period Td(3) in (D) of FIG. 4. In (D) of FIG. 6, the disturbance light occurred in the abnormality detection period Td(3) and only the output (processed received light signal) of the light-receiving element 11(3) in this abnormality detection period Td(3) is larger than the "ON threshold value (predetermined value)" which is indicated by a dotted line, while outputs in the other abnormality detection periods Td are not more than the "ON threshold value".

In the multiple optical-axis photoelectric sensor 1, the light-receiving elements 11 carry out light-receiving processes only in the light-receivable periods Ts, respectively, that is, the light-receiving elements 11(1) through 11(n) carry out the light-receiving processes only in the light-receivable periods Ts(1) through Ts(n), respectively. In a case where disturbance light occurs in a light-receivable period Ts (in an abnormality detection period Td), there occurs an increase in only an output of the light-receiving element 11 in the light-receivable period Ts while no change occurs in outputs of other light-receiving elements 11 in other light-receivable periods Ts. Accordingly, the developer of the multiple optical-axis photoelectric sensor 1 has found that there is a tendency that "in a case where abnormality in output is caused by disturbance light, the abnormality in output (a phenomenon in which the value of the processed received light signal increases in the abnormality detection period Td) does not occur at consecutive optical axes.

In light of the above, the multiple optical-axis photoelectric sensor 1 determines that "disturbance light occurred", in a case where there is no consecutive "abnormality detection periods Td in each of which the output (processed received light signal) is larger than the ON threshold value (predetermined value) (i.e., light-receivable periods Ts in which abnormality in output occurs) in one light-receiving cycle Tc.

As described above with reference to FIGS. 4, 5, and 6, the outputs of the light-receiving elements 11 (in particular, the outputs in the abnormality detection periods Td) differ depending on a case where (i) no noise (neither electrical noise nor disturbance light) is occurring, (ii) electrical noise is occurring, or (iii) disturbance light is occurring. Accordingly, the multiple optical-axis photoelectric sensor 1 (in particular, light receiver 10) utilizes the above difference and carries out the cause determining process for determining a cause of abnormality in output of the light-receiving elements 11. The following will discuss the cause determining process which is carried out by the light receiver 10, with reference to FIG. 7.

§ 3. Operation Example

Figure 7:
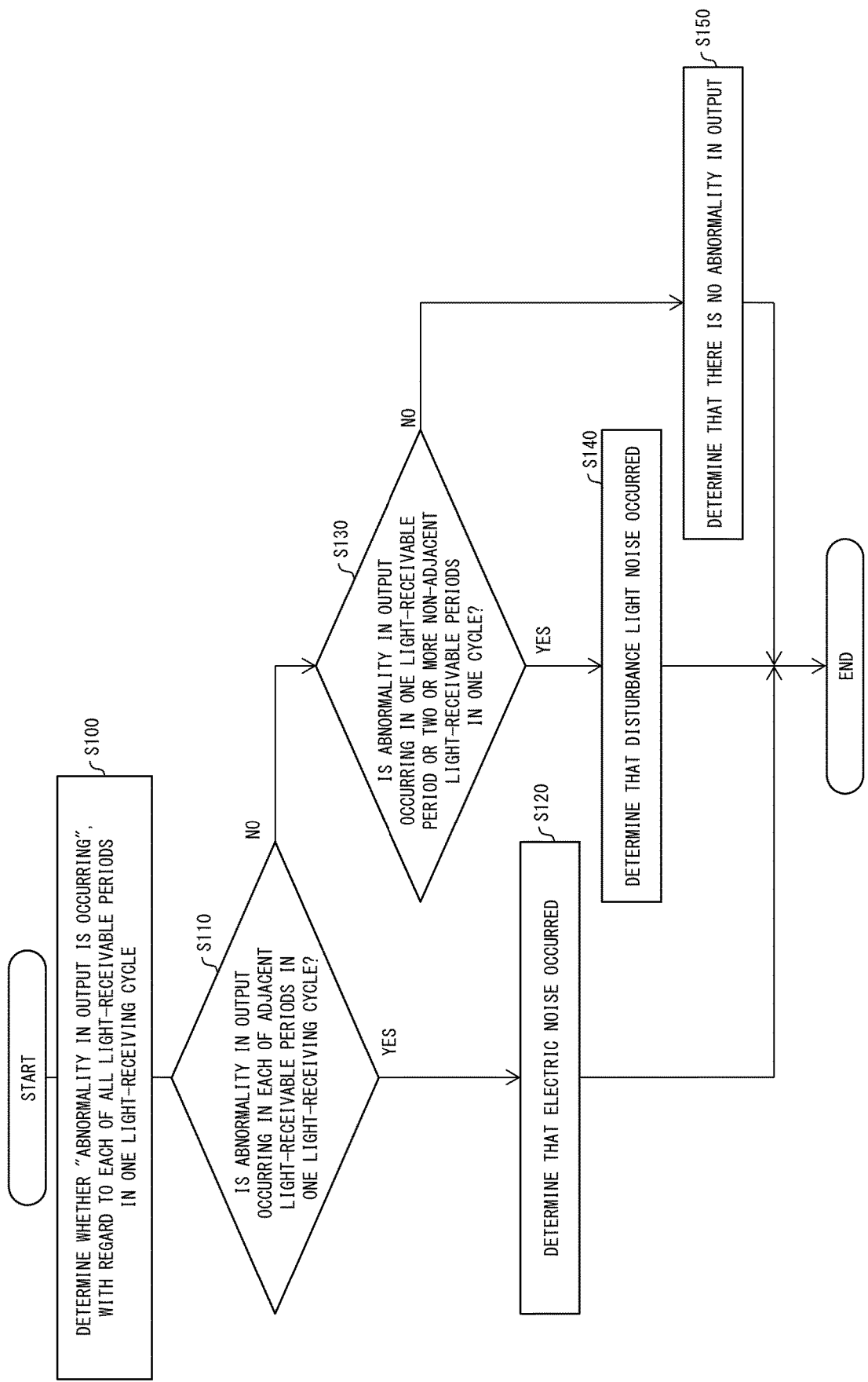
FIG. 7 is a flow chart showing an overview of a noise cause determining process which is carried out by the light receiver illustrated in FIG. 1.

FIG. 7 is a flow chart showing an overview of a noise cause determining process (cause determining process for determining a cause of abnormality in output of a light-receiving element 11) which is carried out by the light receiver 10. First, the first determining section 120 determines whether "abnormality in output is occurring", with regard to each of all light-receivable periods Ts in one light-receiving cycle Tc (S100). The first determining section 120 here determines "whether an output of the light-receiving element 11 in an abnormality detection period Td is larger than a predetermined value", with regard to each of all abnormality detection periods Td in the one light-receiving cycle Tc (i.e., one light-emitting cycle). In a case where an output of a light-receiving element 11(m) in an abnormality detection period Td(m) is larger than the predetermined value, the first determining section 120 determines that "abnormality in output occurs" in a light-receivable period Ts(m) corresponding to the abnormality detection period Td(m). As described above, the abnormality detection period Td(m) is a "period excluding a light-emitting period Te(m) from the light-receivable period Ts(m)". The abnormality detection period Td(m) refers to, for example, a "period from the start of the light-receivable period Ts(m) to the start of the light-emitting period Te(m)".

The second determining section 130 determines whether "abnormality in output is occurring in each of adjacent light-receivable periods Ts in the one light-receiving cycle Tc" (S110). More specifically, the second determining section 130 checks "whether or not the first determining section 120 determined that 'abnormality in output is occurring' with regard to both of adjacent light-receivable periods Ts(m) and Ts(m+1) in the one light-receiving cycle Tc". In a case where with regard to both of adjacent light-receivable periods Ts(m) and Ts(m+1) in the one light-receiving cycle Tc, the first determining section 120 has determined that "abnormality in output is occurring" (Yes at S110), the second determining section 130 determines that electrical noise occurred (S120).

In a case where "abnormality in output is not occurring in both of the light-receivable periods Ts which are adjacent to each other in the one light-receiving cycle Tc" (No at S110), the second determining section 130 further determines the following. In other words, the second determining section 130 determines "whether abnormality in output is occurring in one light-receivable period Ts or two or more non-adjacent light-receivable periods Ts in one light-receiving cycle Tc" (S130).

In a case where the "abnormality in output is occurring in one light-receivable period Ts or two or more non-adjacent light-receivable periods Ts in the one light-receiving cycle Tc" (Yes at S130), the second determining section 130 determines that disturbance light noise occurred (S140). For example, in a case where the first determining section 120 has determined that "abnormality in output is occurring in the light-receivable period Ts(m), but abnormality in output is occurring in neither the light-receivable period Ts(m+1) nor the light-receivable period Ts(m−1)", the second determining section 130 determines that disturbance light noise occurred.

In other words, the second determining section 130 determines that disturbance light noise occurred, in a case where, in the one light-receiving cycle Tc, there is only one light-receivable period Ts (e.g., only a light-receivable period Ts(m)) in which "abnormality in output occurred" according to a result of determination by the first determining section 120.

Furthermore, the second determining section 130 determines that disturbance light noise occurred, in a case where (i) in one light-receiving cycle Tc, there are a plurality of light-receivable periods Ts in each of which "abnormality in output occurred" according to a result of determination by the first determining section 120, but (ii) these light-receivable periods Ts are not adjacent to each other in the one light-receiving cycle Tc. For example, in a case where the first determining section 120 has determined that "abnormality in output is occurring in light-receivable period Ts(m) and Ts(m+p) but that the abnormality in output is occurring in neither the light-receivable period Ts(m+1) nor the light-receivable period Ts(m−1)", the second determining section 130 determines that disturbance light noise occurred. Note that "p" is "an integer of not less than 2".

In a case where it has been determined that "abnormality in output occurs in no light-receivable period Ts in the one light-receiving cycle Tc" (No at S130), the second determining section 130 determines that there is no abnormality in output (S150). In other words, in a case where in the one light-receiving cycle Tc, there is no light-receivable period Ts in which "abnormality in output occurred" according to a result of determination by the first determining section 120, the second determining section 130 determines that there is no abnormality in output.

As described above with reference to FIG. 7, the cause determining process, which is carried out by the light receiver 10, is a control method of the light receiver 10 (determining device) which is configured to determine a cause of abnormality in output of the light-receiving element 11 in the multiple optical-axis photoelectric sensor 1. The cause determining process includes the steps of: A) determining whether or not abnormality in output occurred, with regard to each of respective light-receivable periods Ts of the light-receiving elements 11, the light-receivable periods Ts being arranged in a light-receiving cycle Tc (one cycle) so as not to Ts overlap with each other (S100); and B) (1) determining that electrical noise occurred (S120), in a case where, with regard to each of adjacent light-receivable periods Ts among the light-receivable periods Ts in the one light-receiving cycle Tc, it is determined in the step A) that the abnormality in output occurred (Yes at S110), or (2) determining that disturbance light noise occurred (S140), in a case where with regard to one light-receivable period Ts or two or more non-adjacent light-receivable periods Ts among the light-receivable periods Ts in the one light-receiving cycle Tc, it is determined in the step A) that the abnormality in output occurred (Yes at S130).

In the above configuration, in the cause determining process which is carried out by the light receiver 10, it is determined that (1) electrical noise occurred, in a case where abnormality in output is found in each of adjacent light-receivable periods Ts in one light-receiving cycle Tc. On the other hand, in the cause determining process which is carried out by the light receiver 10, it is determined that (2) disturbance light noise occurred, in a case where abnormality in output is found in one light-receivable period Ts or two or more non-adjacent light-receivable periods Ts in the one light-receiving cycle Tc.

Therefore, the cause determining process, which is carried out by the light receiver 10, advantageously makes it possible to determine whether abnormality in output of the light-receiving element 11 is caused by the occurrence of electrical noise or by the occurrence of disturbance light noise.

§ 4. Variations (Method of Determining Cause of Abnormality in Output)

The above has described an example in which the second determining section 130 determines that abnormality in output occurred, in a case where "abnormality in output is occurring in each of adjacent light-receivable periods Ts in one light-receiving cycle Tc". In other words, the above has described an example in which the second determining section 130 determines that electrical noise occurred, in a case where with regard to both of adjacent light-receivable periods Ts(m) and Ts(m+1) in one light-receiving cycle Tc, the first determining section 120 has determined that "abnormality in output is occurring". Further, in the example discussed above, in a case where "abnormality in output is occurring in one light-receivable period Ts or two or more non-adjacent light-receivable periods Ts in one light-receiving cycle Tc", the second determining section 130 determines that disturbance light noise occurred.

In other words, in a case where abnormality in output occurred in any one of light-receivable periods Ts in one light-receiving cycle, the second determining section 130, which has been so far described, determines a cause of abnormality in output with reference to the following criteria. That is, the second determining section 130 determines a cause of abnormality in output, depending on "whether abnormality in output occurred in all of p consecutive light-receivable periods Ts in one light-receiving cycle Tc", where "p=2".

However, "p" only needs to be "an integer of not less than 2", and "p=2" is not essential for the multiple optical-axis photoelectric sensor 1, in particular, for the control section 100. On the assumption that "p" is "an integer of not less than 2", the second determining section 130 can determine that electrical noise occurred in a case where "abnormality in output occurred in all of p consecutive light-receivable periods Ts in one light-receiving cycle Tc". On the other hand, even in a case where abnormality in output occurred in some of light-receivable periods Ts in the one light-receiving cycle Tc, the second determining section 130 can determine that disturbance light noise occurred unless "abnormality in output occurred in all of p consecutive light-receivable periods Ts in one light-receiving cycle Tc".

Further, a user can set "p", and the second determining section 130 can determine, by using the "p" which has been set by a user, a cause of abnormality in output depending on whether or not "abnormality in output occurred in all of p consecutive light-receivable periods Ts in one light-receiving cycle Tc".

For example, in a case where "p=3", the second determining section 130 carries out the following determination. In other words, the second determining section 130 determines that electrical noise occurred, in a case where "with regard to all of adjacent light-receivable periods Ts(m), Ts(m+1), and Ts(m+2) in one light-receiving cycle Tc, the first determining section 120 has determined that 'abnormality in output occurred'". In a case where "the first determining section 120 has determined that 'abnormality in output is occurring' in the light-receivable period Ts(m) but that 'abnormality in output is not occurring' in at least one of the light-receivable period Ts(m+1) and the light-receivable period Ts(m+2)", the second determining section 130 determines that disturbance light noise occurred.

In other words, the second determining section 130 only needs to be capable of determining a cause of abnormality in output which occurred, depending on "whether or not abnormality in output is occurring in all of p consecutive light-receivable periods Ts in one light-receiving cycle Tc", on the assumption that "p" is "an integer of not less than 2".

(Cause Determining Device Configured to Determine Cause of Abnormality in Output of Light-Receiving Element in Multiple Optical-Axis Photoelectric Sensor)

The above has described a configuration example in which the light receiver 10 includes the control section 100. In other words, the above has described an example in which the light receiver 10 of the multiple optical-axis photoelectric sensor 1 carries out the cause determining process for determining a cause of abnormality in output of a light-receiving element 11. However, it is not essential to realize, in the light receiver 10, the determining device configured to determine abnormality in output of the light-receiving element 11. That is, the control section 100 does not necessarily need to be provided in the light receiver 10. The cause determining process may be carried out by a device, such as a computer, which is outside the multiple optical-axis photoelectric sensor 1.

For example, the control section 100 can be provided in a computer which is connected to the multiple optical-axis photoelectric sensor 1 via a communication cable. In other words, it may be a computer including the control section 100 that determines (i) whether or not abnormality in output occurred and (ii) a cause of the abnormality in output. In this case, the computer obtains respective outputs of a plurality of light-receiving elements 11 in one light-receiving cycle from the multiple optical-axis photoelectric sensor 1 (in particular, light receiver 10) via a communication cable.

More specifically, a programmable logic controller (PLC) including the control section 100 may determine (i) whether or not abnormality in output occurred and (ii) a cause of the abnormality in output, by obtaining respective outputs of a plurality of light-receiving elements 11 in one light-receiving cycle. The determining device configured to determine a cause of abnormality in output of the light-receiving element 11 can be realized by a computer, by loading, on the computer, an information processing program for causing the computer to carry out the cause determining process which has been described above, and causing the computer to function as each section illustrated in FIG. 1. Alternatively, the determining device configured to determine a cause of abnormality in output of the light-receiving element 11 can be realized by a computer, by loading, on the computer, such an information processing program from a computer-readable storage medium in which the information processing program is stored.

[Software Implementation Example]

Control blocks of the control section 100 (particularly, the light-receiving-element-output obtaining section 110, the first determining section 120, the second determining section 130, the storing section 140 and the notification control section 150) can be realized by a logic circuit (hardware) provided in an integrated circuit (IC chip) or the like or can be alternatively realized by software.

In the latter case, a computer including the control section 100 can be realized by a computer that executes instructions of a program that is software realizing the foregoing functions. The computer realizing the computer including the control section 100, for example, includes at least one processor and a computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

Aspects of the present invention can also be expressed as follows:

A determining device in accordance with an aspect of the present invention is a determining device configured to determine a cause of abnormality in output of a light-receiving element among light-receiving elements in a multiple optical-axis photoelectric sensor, the determining device including: a first determining section configured to determine whether or not abnormality in output occurred, with regard to each of respective light-receivable periods of the light-receiving elements, the light-receivable periods being arranged in one cycle so as not to overlap with each other; and a second determining section configured to (1) determine that electrical noise occurred, in a case where, with regard to each of adjacent light-receivable periods among the light-receivable periods in the one cycle, the first determining section has determined that the abnormality in output occurred, or (2) determine that disturbance light noise occurred, in a case where, with regard to one light-receivable period or two or more non-adjacent light-receivable periods among the light-receivable periods in the one cycle, the first determining section has determined that the abnormality in output occurred.

In the above configuration, the determining device determines that (1) electrical noise occurred, in a case where abnormality in output is found in each of the adjacent light-receivable periods in the one cycle. Further, the determining device determines that (2) disturbance light noise occurred, in a case where abnormality in output is found in the one light-receivable period or the two or more non-adjacent light-receivable periods in the one cycle.

This advantageously allows the determining device to determine whether abnormality in output of the light-receiving element is caused by the occurrence of electrical noise or by the occurrence of disturbance light noise.

The determining device in accordance with an aspect of the present invention can be configured such that: the light-receivable periods are arranged to correspond to light-emitting periods, respectively; and the first determining section is configured to determine, with regard to each of the light-receivable periods in the one cycle, that the abnormality in output occurred, in a case where an output exceeds a predetermined value in a period excluding, from the each of the light-receivable periods, a corresponding one of the light-emitting periods.

In the above configuration, with regard to each of the plurality of light-receivable periods, the determining device determines that abnormality in output occurred, in a case where an output exceeds the predetermined value in a period excluding, from the each of the light-receivable periods, a corresponding one of the light-emitting periods. In the light-emitting period, the output suddenly increases since the light-receiving element receives light which has been emitted from the light-emitting element.

Therefore, by "determining that abnormality in output occurred, in a case where an output exceeds the predetermined value in a period excluding, from each of the light-receivable periods, a corresponding one of the light-emitting periods", the determining device advantageously makes it possible to improve the accuracy of determination on whether or not abnormality in output occurred.

The determining device in accordance with an aspect of the present invention can be configured to further include: a storing section configured to store, in a storage section, outputs in the adjacent light-receivable periods in which the electrical noise occurred according to a result of determination by the second determining section.

In the above configuration, the determining device stores, in the storage section, outputs in light-receivable periods in which electrical noise occurred according to a result of determination by the second determining section. Therefore, the determining device advantageously allows a user to check the outputs of the light-receiving elements which outputs were made at the time when the electrical noise occurred.

The determining device in accordance with an aspect of the present invention can be configured to further include: a notifying section configured to differently notify a user of (1) a case where it has been determined by the second determining section that the electrical noise occurred or (2) a case where it has been determined by the second determining section that the disturbance light noise occurred.

In the above configuration, the determining device differently notifies a user of (1) a case where the electrical noise occurred or (2) a case where the disturbance light noise occurred.

This advantageously allows the determining device to notify a user whether abnormality in output of the light-receiving element is caused by electrical noise or disturbance light noise.

The determining device in accordance with an aspect of the present invention can be configured to further include: a filtering section configured to remove the electrical noise which caused the abnormality in output, in a case where it has been determined by the second determining section that the electrical noise occurred.

In the above configuration, the determining device removes the electrical noise which was a cause of abnormality in output of the light-receiving element, in a case where it has been determined that the electrical noise occurred.

Therefore, the determining device advantageously makes it possible to restore the output of the light-receiving element to a normal state by removing the electrical noise which caused the abnormality in output, in a case where the occurrence of the electrical noise resulted in the abnormality in output of the light-receiving element.

A multiple optical-axis photoelectric sensor in accordance with an aspect of the present invention can be configured to include the determining device in accordance with an aspect of the present invention. In the above configuration, the multiple optical-axis photoelectric sensor determines that (1) electrical noise occurred, in a case where abnormality in output is found in each of the adjacent light-receivable periods in the one cycle. On the other hand, the multiple optical-axis photoelectric sensor determines that (2) disturbance light noise occurred, in a case where the abnormality in output is found in the one light-receivable period or the two or more non-adjacent light-receivable periods in the one cycle.

This advantageously allows the multiple optical-axis photoelectric sensor to determine whether abnormality in output of the light-receiving element is caused by the occurrence of electrical noise or by the occurrence of disturbance light noise.

A control method in accordance with an aspect of the present invention is a method of controlling a determining device configured to determine a cause of abnormality in output of a light-receiving element among light-receiving elements in a multiple optical-axis photoelectric sensor, the method including the steps of: A) determining whether or not abnormality in output occurred, with regard to each of respective light-receivable periods of the light-receiving elements, the light-receivable periods being arranged in one cycle so as not to overlap with each other; and B) (1) determining that electrical noise occurred, in a case where, with regard to each of adjacent light-receivable periods among the light-receivable periods in the one cycle, it is determined in the step A) that the abnormality in output occurred, or (2) determining that disturbance light noise occurred, in a case where, with regard to one light-receivable period or two or more non-adjacent light-receivable periods among the light-receivable periods in the one cycle, it is determined in the step A) that the abnormality in output occurred.

In the above configuration, the control method includes determining that (1) electrical noise occurred, in a case where the abnormality in output is found in each of the adjacent light-receivable periods in the one cycle. Further, the control method includes determining that (2) disturbance light noise occurred, in a case where the abnormality in output is found in the one light-receivable period or the two or more non-adjacent light-receivable periods in the one cycle.

Therefore, the control method advantageously makes it possible to determine whether abnormality in output of the light-receiving element is caused by the occurrence of electrical noise or by the occurrence of disturbance light noise.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1 multiple optical-axis photoelectric sensor (determining device)
10 light receiver (determining device)
11 light-receiving element
20 light emitter
21 light-emitting element
120 first determining section
130 second determining section
140 storing section
160 filtering section
200 storage section
300 notifying section
Tc light-receiving cycle (cycle)
Te light-emitting period
Ts light-receivable period
S100 first determination step
S110 second determination step
S130 second determination step

The invention claimed is:

1. A determining device configured to determine a cause of abnormality in output of a light-receiving element among light receiving elements in a multiple optical-axis photoelectric sensor, the determining device comprising:
a first determining section configured to determine whether or not abnormality in output occurred, with regard to each of respective light-receivable periods of the light-receiving elements, the light-receivable periods being arranged in one cycle so as not to overlap with each other; and
a second determining section configured to (1) determine that electrical noise occurred, in a case where, with regard to each of adjacent light-receivable periods among the light-receivable periods in the one cycle, the first determining section has determined that the abnormality in output occurred, or (2) determine that disturbance light noise occurred, in a case where, with regard to one light-receivable period or two or more non-adjacent light-receivable periods among the light-receivable periods in the one cycle, the first determining section has determined that the abnormality in output occurred.

2. The determining device as set forth in claim 1, wherein:
the light-receivable periods are arranged to correspond to light-emitting periods, respectively; and
the first determining section is configured to determine, with regard to each of the light-receivable periods in the one cycle, that the abnormality in output occurred, in a case where an output exceeds a predetermined value in a period excluding, from the each of the light-receivable periods, a corresponding one of the light-emitting periods.

3. A determining device as set forth in claim 1, further comprising:
a storing section configured to store, in a storage section, outputs in the adjacent light-receivable periods in which the electrical noise occurred according to a result of determination by the second determining section.

4. A determining device as set forth in claim 1, further comprising:
a notifying section configured to differently notify a user of (1) a case where it has been determined by the second determining section that the electrical noise occurred or (2) a case where it has been determined by the second determining section that the disturbance light noise occurred.

5. A determining device as set forth in claim 1, further comprising:
a filtering section configured to remove the electrical noise which caused the abnormality in output, in a case where it has been determined by the second determining section that the electrical noise occurred.

6. A multiple optical-axis photoelectric sensor comprising:
a determining device according to claim 1.

7. A method of controlling a determining device configured to determine a cause of abnormality in output of a light-receiving element among light-receiving elements in a multiple optical-axis photoelectric sensor, the method comprising the steps of:
A) determining whether or not abnormality in output occurred, with regard to each of respective light-receivable periods of the light-receiving elements, the light-receivable periods being arranged in one cycle so as not to overlap with each other; and
B) (1) determining that electrical noise occurred, in a case where, with regard to each of adjacent light-receivable periods among the light-receivable periods in the one cycle, it is determined in the step A) that the abnormality in output occurred, or (2) determining that disturbance light noise occurred, in a case where, with regard to one light-receivable period or two or more non-adjacent light-receivable periods among the light-receivable periods in the one cycle, it is determined in the step A) that the abnormality in output occurred.

8. A non-transitory computer-readable storage medium storing therein an information processing program for causing a computer to function as a determining device according to claim 1, the program causing the computer to function as each of the foregoing sections.

* * * * *